Dec. 13, 1966  C. L. NIGH  3,291,543

BEARING ASSEMBLY

Filed April 14, 1964

INVENTOR.
Carl L. Nigh
BY
Peter P. Kozak
ATTORNEY

3,291,543
BEARING ASSEMBLY
Carl L. Nigh, Brownsburg, Ind., assignor to General Motors Corporation, Detroit, Mich., a corporation of Delaware
Filed Apr. 14, 1964, Ser. No. 359,580
6 Claims. (Cl. 308—160)

This invention relates generally to bearings and more particularly to a bearing and bearing assembly having high unit-area load capacity due to the establishment of a wedge-like oil film under high pressure conditions between opposed relatively movable bearing surfaces of the assembly during bearing operation.

The principles by which bearing assemblies involving the use of a wedge-like oil film are enabled to bear unit-area loads are well-known and understood in the art. Two types of thrust bearing assemblies which utilize these principles but have distinctly different structural and operational characteristics are the "Tapered-Land" thrust bearing assembly and the "Kingsbury" or "Tilting Block" thrust bearing assembly, as they are commonly referred to in the art.

The "Tapered-Land" thrust bearing assembly ordinarily consists of a stationary annular bearing member having a radially segmented annular bearing surface thereon which is adapted to thrust against a generally flat mating annular bearing surface of a relatively rotatable bearing member to limit the axial thrust of a rotatable shaft which is affixed to the latter bearing member. The segmented annular bearing surface of the former bearing member is formed of a plurality of equal sized, radially extending pads which project axially from the bearing member and are separated from each other by radially extending grooves in the bearing member. Oil is supplied through the grooves under pressure to the mating bearing surfaces of the assembly to provide a lubricating oil film therebetween during bearing operation. Each of the pads consists of a radially extending, generally flat land section at one end adjacent to an oil groove and a radially extending contiguous tapered section of fixed inclination which tapers axially inwardly from the land section to an oil groove at the opposite end of the pad. The land section of each pad may include about 20% to 25% of the thrust surface of the pad to provide optimum bearing load carrying capacity during bearing operation and to carry the load during starting and stopping periods of bearing operation.

The thrust bearing surfaces of the land sections of all the pads in a "Tapered-Land" thrust bearing must lie in the same radial plane within close tolerances in order to provide proper alignment between the mating bearing surfaces of the assembly. Of course, this requires the use of very accurate machining techniques which are relatively expensive to perform. Also, the angle of inclination of the tapered sections of the pads are quite critical from a hydrodynamic standpoint to the operation of this type of bearing. Thus, the amount of taper on the tapered section of each pad must be very accurately controlled by the use of relatively expensive machining techniques to provide for optimum load carrying capacity for a specific designed bearing load condition. Hence, since the amount of taper in a "Tapered-Land" thrust bearing is fixed, optimum load carrying capacity of the wedge-like oil film, which is established between the tapered bearing surface of each pad and the flat mating bearing surface, is obtained only when the bearing is operating under the specific load condition for which it was designed.

However, the tapered sections of the pads in a "Tapered-Land" thrust bearing are susceptible to elastic and thermal deformation during bearing operation. Thus, these bearings are relatively difficult to design and do not always perform satisfactorily or meet the load carrying requirements in operation for which the bearing was designed. This is especially true when relatively small amounts of taper are used to provide increased bearing load carrying capacity, since a slight deformation may result in neutralizing the oil wedge or even inducing taper in the wrong direction. Moreover, since the tapered section of each pad is of fixed inclination in the same direction of rotation and the wedge-like oil film must be established in the direction of relative motion, as called for in the well-known Reynolds' theory of lubrication, a "Tapered-Land" thrust bearing assembly can be operated in only one direction of rotation.

The aforesaid fabrication, structural and operational deficiencies of "Tapered-Land" thrust bearings led to the development of the "Tilting Block" or "Kingsbury" thrust bearing. As previously mentioned, the latter bearing distinctly differs from the "Tapered-Land" bearing in both operational and structural characteristics and has several advantages over the "Tapered-Land" bearing assembly, as will hereinafter be more fully explained. In the "Kingsbury" thrust bearing, the annular bearing surface, which corresponds to the bearing surfaces formed on the pads in a "Tapered-Land" thrust bearing, is formed by bearing surfaces on a plurality of individual shoes, each of which is separately mounted on a base ring by resilient or pivotal support members so that the shoes will tilt to form a plurality of wedge-shaped oil films between the bearing surfaces of the shoes and the bearing surface of the mating bearing member of the bearing assembly when an axial thrust load is applied therebetween. There are no rigidly supported, flat land sections forming a bearing surface in a "Kingsbury" type bearing.

Thus, unlike the fixed tapered and land sections in a "Tapered-Land" bearing, the shoes of a "Kingsbury" bearing are capable of tilting independently to form an optimum oil film taper for any given thrust load which is applied thereto, thereby providing optimum load carrying capacity over a wide range of load conditions during bearing operation. Also, the thermal and elastic deformation of the shoes is automatically compensated for in the "Kingsbury" bearing construction, due to the inherent self-adjusting feature of the individually supported shoes. Moreover, the shoes may be readily mounted in a manner to tilt or deflect in either direction so that a "Kingsbury" type thrust bearing may satisfactorily operate in opposite directions of rotation.

However, a "Kingsbury" thrust bearing is comparatively bulky and inherently more expensive to manufacture than a typical "Tapered-Land" thrust bearing, since the "Kingsbury" bearing normally consists of more parts, and each shoe must be carefully and individually machined and supported in the assembly. Also, the problems involved in adequately lubricating a "Kingsbury" bearing assembly are more difficult, since only limited control of the oil flow to the bearing surfaces of the shoes can be maintained during bearing operation due to the spaces necessarily left free around each shoe. Furthermore, as is well-known in the art, starting friction in a "Kingsbury" bearing assembly is often appreciably higher than the friction which exists during the normal operation of the bearing after the wedge-like oil films have been established between the opposed bearing surfaces. The magnitude of this starting friction tends to cause a relatively high stress to be set up in the resilient or pivotal support members, such as flexible metal stems and pads or small rigid pivot posts, which are commonly employed to mount the individual shoes on the base ring. Thus, if these support members are made sufficiently small or flexible to assure the desired yielding or tilting of the shoes under normal bearing operating loads, there is danger that the starting friction, particularly under unfavorable conditions, will cause a permanent distortion of the support members, resulting in a deleterious effect on bearing operation.

Therefore, it is a principal object of the present invention to provide a simple compact bearing of relatively inexpensive construction which has a high unit-area load capacity and provides for optimum load carrying capacity over a wide range of load conditions during bearing operation and which avoids the aforementioned problems of the "Tapered-Land" and "Kingsbury" type bearings.

It is another object of the present invention to provide a bearing for use under high pressure and high temperature conditions which is not detrimentally affected during normal operation by thermal or elastic deformation of the parts of the bearing or by abnormally high stresses imparted thereto during the starting period of bearing operation.

It is a further object of the present invention to provide a bearing assembly in which the problems of maintaining adequate lubrication between the bearing surfaces of the assembly under high pressure conditions are minimized.

It is a still further object of the present invention to provide a thrust bearing assembly having high unit-area load capacity for use in a turbocharger or similar device.

These and other objects are accomplished in accordance with the present invention by provision of a bearing assembly which includes a pair of relatively movable bearings having opposed bearing surfaces thereon which are separated from each other by a thin oil film during bearing operation. The bearing surface of one of the bearings of the assembly is formed by the outer surface of a relatively thin, flexible metal bearing member having a plurality of separated segments therein. The bearing member is secured to an underlying base member having a plurality of separated relieved portions therein which are equal in sumber to the number of segments in the bearing member. The bearing member is indexed on the base member so that a portion of each segment thereof is supported on the base member in a manner to provide a plurality of separated, rigidly supported fixed bearing surfaces which are capable of carrying abnormally high starting loads. The other portion of each segment extends over an adjacent relieved portion in the underlying base member so that the latter portions of the bearing member are capable of deflecting under load into the relieved portions in the base member to a degree in proportion to the amount of load applied thereto during normal bearing operation. Thus, a plurality of tapered bearing surfaces are provided between the opposed relatively movable bearing members of the subject bearing assembly during normal bearing operation. Hence, a plurality of wedge-like oil films may be established between the opposed bearing surfaces of the assembly during bearing operation to provide high unit-area load carrying capacity over a wide range of bearing load conditions.

Other objects, features and advantages of the present invention will be apparent from the following detailed description of certain embodiments thereof, taken in conjunction with the accompanying drawing, in which.

Figure 1:
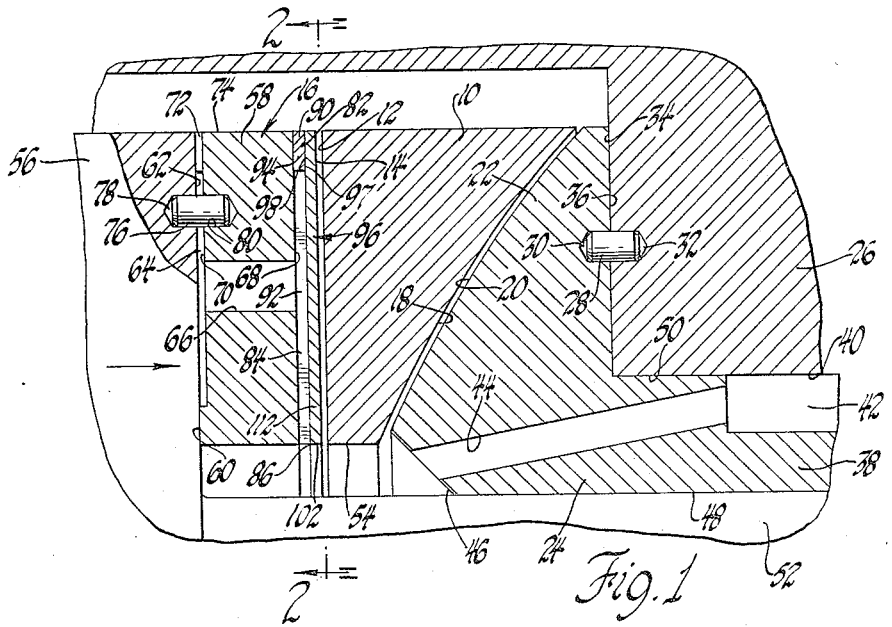
FIGURE 1 is a fragmentary longitudinal view in partial cross section of a thrust bearing assembly embodying the present invention.
Figure 2:
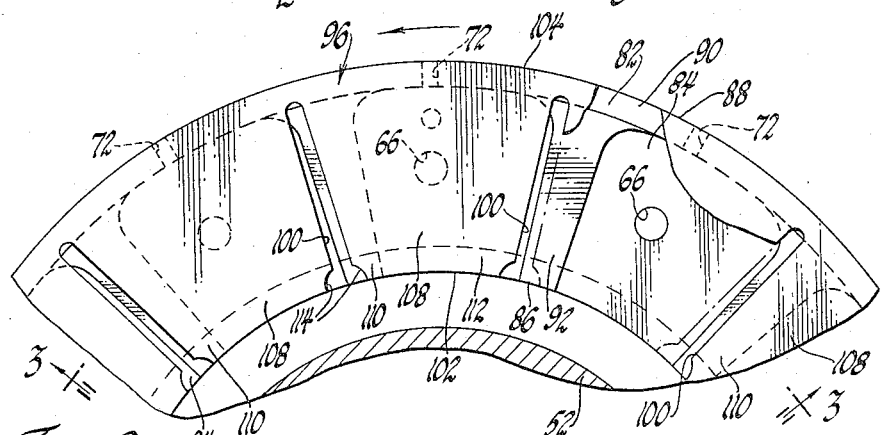
FIGURE 2 is a fragmentary end view of a bearing embodying the present invention which is used in the thrust bearing assembly shown in FIGURE 1 and taken along the line 2—2 of FIGURE 1.
Figure 3:
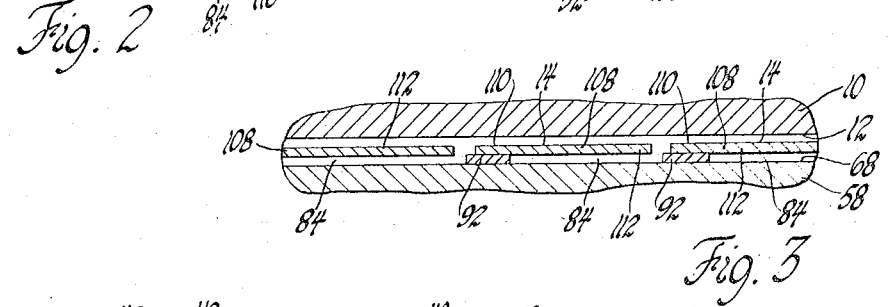
Figure 4:
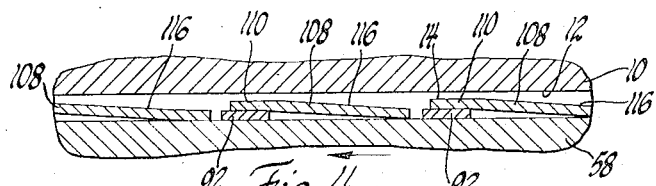

FIGURE 3 is a fragmentary cross-sectional view of the bearing assembly shown in FIGURE 1 taken along the line 3—3 of FIGURE 2 showing the subject bearing of the present invention in an unloaded condition or in a loaded condition during the starting period of bearing operation; and FIGURE 4 is the same view as FIGURE 3 except that the subject bearing of the present invention is in a loaded condition during normal bearing operation.

While for purposes of illustration the subject bearing and bearing assembly of the present invention is embodied in the thrust bearing assembly shown in the drawing, it is not necessarily limited thereto, as will hereinafter be more fully explained. Also, while the present invention has been illustrated in a thrust bearing assembly for a horizontal shaft, it is to be expressly understood that the invention is applicable to bearings for inclined or vertical shafts. Furthermore, the subject invention can be embodied in bearing assemblies of any suitable size for use in a wide variety of applications, wherein the load developed between the subject bearing and the other relatively movable bearing member of the subject bearing assembly is sufficient to establish a wedge-like oil film between the mating bearing surfaces of the assembly during bearing operation.

Moreover, the number and size of the segments in the subject bearing which provide the flexible tapered bearing surfaces and the rigidly supported fixed bearing surfaces of the subject bearing may vary considerably depending on the desired structural and operational characteristics and requirements which the subject bearing is designed to meet. Also, the number and size of these segments may be determined by utilizing the well-known principles involved in designing the "Tapered-Land" and "Kingsbury" type bearings. Thus, when the subject bearing is embodied in a thrust bearing assembly, as shown in the drawing, the number of flexible segments therein preferably should not be less than three, in accordance with "Kingsbury" bearing design principles. However, it will be appreciated that the structural and operational characteristics of the subject bearing and bearing assembly distinctly differ from those of either the "Tapered-Land" or "Kingsbury" type bearing, as will hereinafter be more fully explained.

Referring to FIGURE 1 of the drawing, the thrust bearing assembly shown there includes an annular thrust bearing member 10 which is provided with an annular, generally flat, axial thrust bearing surface 12 on its axially outer end which is adapted to thrust against the mating annular axial thrust bearing surface 14 of a bearing 16 embodying the present invention during bearing operation, as will hereinafter be more fully explained. The axially inner end of the thrust bearing member 10 is provided with a concave spherical seat surface 18 which is conventionally engaged and seated in a relatively non-rotatable self-aligning relationship with the axially outer convex surface 20 of an enlarged annular end portion 22 of an annular spherical seat thrust bearing member 24.

The latter bearing member 24 may be secured in non-rotatable engagement to the housing 26 of a turbocharger or similar device by any suitable means, such as a stud 28 positioned between mating openings 30 and 32 which are provided respectively in the wall 34 of the housing 26 and the mating flat axially inner end surface 36 of the enlarged end portion 22 of the spherical seat thrust bearing member 24. Thus, in the embodiment of the present invention shown in the drawing, the thrust bearing member 10 is relatively stationary and the subject bearing 16 rotates during bearing operation, as will hereinafter be more fully explained. However, it should be appreciated that the present invention may be embodied in the bearing structures in which the subject bearing is stationary and the other bearing member of the subject bearing assembly is movable during bearing operation. Also, while the stationary thrust bearing member 10 of the bearing assembly illustrated in the drawing is of the conventional spherical seat self-aligning type, the subject bearing assembly of the present invention is not limited thereto and a nonself-aligning type of bearing may be suitably employed in a bearing structure embodying the present invention.

The thrust bearing member 10 or its counterpart in another bearing structure embodying the present invention may be made of any suitable material, such as silver alloys, bronze alloys, aluminum alloys, and steels, depending upon the structural and operational requirements for which the bearing and bearing assembly are designed. For maximum resistance to seizure under boundary conditions, such as during the starting or stopping periods of bearing operation, the axial thrust bearing surface 12 of the bearing member 10 is preferably coated with a thin layer of a silver-lead or lead-tin alloy.

The spherical seat thrust bearing member 24 has a generally cylindrical stem portion 38 which extends from the end surface 36 of its enlarged annular end portion 22 into a mating generally cylindrical opening 40 in the housing 26. Also, the thrust bearing member 24 may be provided with a groove 42 adjacent the wall defining the opening 40 in the housing and a passageway 44 which extends from the groove 42 through a conical surface 46 which is centrally located in the enlarged end portion 22 and tapers axially inwardly from the convex surface 20 to a generally cylindrical opening 48 which extends axially through the bearing member 24. As will hereinafter be more fully explained, oil may be supplied from the groove 42 through the passageway 44 to the mating thrust bearing surfaces 12 and 14 of the bearing assembly by any suitable means, not shown in the drawing, to provide a lubricating oil film therebetween during bearing operation.

The wall 50 defining the opening 40 in the spherical seat thrust bearing member 24 may function as a radial thrust bearing surface for a generally cylindrical rotatable shaft 52 which extends therethrough and through the central opening 54 in the relatively stationary annular thrust bearing member 10. The shaft 52 is provided with an integral enlarged cylindrical flange portion or shoulder 56 having the bearing 16 embodying the present invention secured thereto and rotatable therewith. The bearing 16 is adapted to provide high unit-area axial thrust load carrying capacity, when the shaft thrusts in the direction of the arrow shown in FIGURE 1 of the drawing during bearing operation, as will hereinafter be more fully explained. Of course, it should be appreciated that although the thrust bearing assembly shown in the drawing is adapted to limit axial movement of the shaft in only one direction, another bearing assembly embodying the present invention could be incorporated in a machine structure to limit the axial movement of the shaft in the opposite direction.

As shown in FIGURE 1 of the drawing, a plate-like annular thrust washer 58 is coaxially aligned with and secured at its axially outer end surface 60 to the axially inner end surface 62 of the shoulder 56 on the shaft 52 so that the washer rotates with the shaft during bearing operation. An annular groove 64 may be provided in the end surface 60 of the washer 58 to reduce the amount of contact between the washer and shaft, thereby minimizing heat flow from the subject bearing assembly to the shaft during bearing operation. Also, the washer 58 may be provided with a plurality of openings 66 extending axially through the axially inner end surface 68 of the washer and the bottom surface 70 of the groove 64 and a plurality of relatively small diameter oil bleed holes 72 extending from the groove 64 through the radially outer cylindrical surface 74 of the washer to permit cooling oil to flow through the washer during bearing operation. The washer 58 may be secured to the shoulder 56 on the shaft by any suitable means, such as studs or pins 76 positioned between opposed openings 78 and 80 in the end surface 62 of the shoulder and the bottom surface 70 of the groove 64 in the washer, respectively.

Referring again to FIGURES 1 and 2 of the drawing, the bearing 16 illustrated therein which embodies the present invention includes a relatively thin, plate-like, annular metal relief pad 82 having a plurality of equal sized, radially extending, relieved portions 84 therein which extend axially through the pad. The relieved portions 84 may be of any suitable radial length, although they preferably should extend radially from the inner diameter 86 of the pad almost to its outer diameter 88. Thus, the outer circumferential peripheral portion 90 of the relief pad 82 is unrelieved. The relieved portions 84 in the relief pad 82 are circumferentially separated from one another by an equal number of unrelieved radially extending portions 92 in the relief pad, which preferably are of smaller arcuate cross section than the relieved portions in the relief pad.

In the thrust bearing assembly shown in the drawing, the relief pad 82 and the thrust washer 58 or their counterparts in another bearing structure embodying the present invention may be made of any suitable metal having good structural strength, such as a low carbon steel, using a relatively inexpensive stamping or machining technique. The axially outer end surface 94 of the relief pad 82 may be secured to the axially inner end surface 68 of the thrust washer 58 by any suitable means, such as a brazing technique. For instance, if the relief pad 82 and the thrust washer 58 are both formed from a low carbon steel, they may be suitably brazed together using a conventional copper brazing technique wherein a thin strip of copper stock is placed between these members and heating them at about 2000° F. in a suitable furnace to form the brazed bond therebetween.

In the thrust bearing assembly shown in the drawing, the relief pad 82 and the washer 58 function as the underlying base member of the bearing 16 embodying the present invention illustrated therein. However, it should be appreciated that the axially inner end surface of the thrust washer could be suitably machined to provide relief portions therein, corresponding to the relieved portions of the relief pad. This, of course, would eliminate the necessity of brazing the relief pad to the thrust washer and in some instances would provide a more compact bearing structure. However, since additional machining of the thrust washer would be necessitated, and since the relief pad may be made by a relatively simple inexpensive stamping technique, the use of the relief pad may reduce fabrication costs in many instances. Also, the axial thickness of the relief pad and thrust washer may vary considerably, depending on the structural features of strength and compactness which are desired. Of course, the relieved portions 84 in the relief pad must be sufficiently deep to permit adequate flexing of the individual flexible segments of the thrust bearing member which is affixed thereto for any given load condition, as will hereinafter be more fully explained.

As shown in FIGURE 1 of the drawing, a relatively thin, flexible, plate-like, annular thrust bearing member 96 having approximately the same outer and inner diameter dimensions as the relief pad 82 is coaxially aligned therewith and rigidly affixed at its axially outer end surface 97 to the axially inner end surface 98 of the relief pad. As previously mentioned, the thrust bearing member 96 is segmented, and the axial inner end surface 14 thereof is adapted to thrust against the mating axial thrust baring surface 12 of the relatively stationary thrust baring member 10 to limit the axial movement of the shaft when it thrusts in the direction of the arrow in FIGURE 1 of the drawing during bearing operation. Of course, the mating axial thrust bearing surfaces 12 and 14 are separated by a lubricating oil film which is provided therebetween under pressure during bearing operation, as will hereinafter be more fully explained.

The segmented flexible thrust bearing member 96 may be made by a relatively simple stamping or machining technique from any suitable metal, such as an SAE 5160 or SAE 52100 steel, and may be secured to the relief pad 82 by any suitable means, such as a brazing technique similar to the copper brazing technique which was previously described for securing the relief pad 82 to the thrust washer 58. In order to obtain maximum wear resistance on the axial thrust surface of the segmented thrust bearing member, it may be desirable to harden the axial thrust bearing surface 14 of the segmented thrust bearing member 96. For instance, if the thrust bearing member 96 is made of steel, conventional carburizing or nitriding techniques may be employed to obtain a bearing surface hardness of about 50 to about 60 on the "Rockwell C" scale. The thrust bearing member may be of any suitable thickness which permits flexing of a portion of the individual segments therein, as will hereinafter be more fully explained.

Referring more particularly to FIGURE 2 of the drawing, the segmented thrust bearing member 96 is provided with a plurality of relatively narrow, radially extending slots 100 therein which are equally circumferentially separated and extend axially through the bearing member. The slots 100 may be of any suitable length, although they preferably should extend radially from the inner diameter 102 of the annular thrust bearing member 96 almost to its outer diameter 104 to provide a plurality of relatively large flexible radially extending segments 108 in the bearing member 96. Of course, the number of segments 108 so formed in the thrust bearing member 96 should be equal in number to the number of relieved portions 84 in the underlying relief pad 82.

The thrust bearing member 96 should be secured to and indexed on the relief pad 82 in a manner so that a relatively small portion 110 of each segment 108 thereof is rigidly supported on the radially extending, generally flat, unrelieved portions 92 of the relief pad 82, and the relatively large, contiguous portion 112 of each segment 108 extends over an adjacent relieved portion 84 of the relief pad. This may be, conveniently accomplished by indexing the flexible thrust bearing member 96 on the relief pad 82 in the manner shown in FIGURE 2 of the drawing. A small cutout 114 may be provided at both radially inner edges of each segment 108 to facilitate oil flow through the bearing assembly during bearing operation, as will hereinafter be more fully explained.

As previously mentioned, the number and size of the flexible segments 108 employed in the thrust bearing member 96 of the subject bearing may vary considerably, depending on the specific structural and operating requirements for which the bearing was designed. In the bearing 16 embodying the present invention, as shown in FIGURE 2 of the drawing, twelve segments 108 are provided in the annular thrust bearing member 96 and twelve relieved portions 84 are provided in the relief pad 82. Also, in the bearing 16, shown in FIGURE 2 of the drawing, the radially extending relieved portions 84 in the relief pad 82 are approximately 20° in arcuate cross section, and the radially extending unrelieved portions 92 are approximately 10° in arcuate cross section. Of course, these dimensions may vary depending on the structural and operational characteristics for which the bearing is designed. Also, the unrelieved outer circumferential portion 90 of the relief pad preferably is relatively small in radial cross section to permit a maximum amount of flexing of the flexible segments 108 of the thrust bearing member 96 during bearing operation.

In the thrust bearing assembly shown in the drawing, the outer circumferential unrelieved portion 90 of the relief pad 82 functions as an oil dam to prevent the bearing from being starved of lubricant during bearing operation under the intense action of centrifugal field acceleration at the high operating speeds of rotation for which the subject bearing is designed. Thus the development and maintenance of an oil film to support the operational axial thrust load developed between the mating bearing surfaces 12 and 14 of the subject bearing assembly is enhanced by use of this oil dam effect, and excessive oil flow between the mating bearing surfaces is prevented. As previously mentioned, this problem is one of the major drawbacks of the "Kingsbury" type bearing, since spaces are necessarily left open between the individual bearing shoes and the base ring on which the shoes are pivotally or resiliently supported, thereby necessitating the use of elaborate control means to maintain adequate lubrication between the relatively movable bearing surfaces of a "Kingsbury" type bearing during operation. However, in the thrust bearing assembly illustrated in the drawing, the oil supply to the bearing may readily be maintained and controlled during bearing operation by supplying oil to the bearing surfaces 12 and 14 from the groove 42 and the passageway 44 in a spherical seat thrust bearing member 24, since there are no relatively large spaces left open in the bearing 16. Of course, as previously mentioned, some oil will pass through the openings 66, groove 64 and oil bleed holes 72 in the thrust washer 58 to cool the bearing 16 and shaft during operation.

Referring to FIGURE 3 of the drawing, the subject bearing is illustrated in an unloaded condition or in a condition which would exist during the starting period of bearing operation. Oil is supplied to the open spaces between the thrust washer 58 and the stationary bearing member 10 to provide a thin film of oil between the mating bearing surfaces 12 and 14 of the subject bearing assembly. It should be appreciated that during the starting period of bearing operation, the load would be primarily carried by the rigidly fixed, flat "land" portions 110 of the segmented thrust bearing member 96 which are secured to the radially extending unrelieved portions 92 of the relief pad 82, since the contiguous unsupported portions 112 of the segmented thrust bearing member 96 are flexible.

It will be noted that the rigidly fixed, flat "land" portions 110 of the thrust bearing member 96 are secured to and supported by the radially extending unrelieved portions 92 of the relief pad over a relatively large area as compared to the conventional small pivotal or resilient support members which are commonly used to support the individual bearing shoes in a "Kingsbury" type bearing. Consequently, the aforementioned problems of the "Kingsbury" bearing by which the bearing members may become permanently deformed or offset by abnormally high loads during the starting periods of bearing operation are substantially eliminated in the subject bearing assembly. This is attributed to the fact that the unrelieved portions 92 of the relief pad 82 are not as susceptible to being elastically deformed as the relatively small pivotal or resilient support members, which are commonly used in a "Kingsbury" type bearing. In fact, these unrelieved portions 92 of the relief pad 82 and the flat "land" portions 110 of the bearing member 96 carry the starting load in a manner similar to the manner in which the land sections function in a "Tapered-Land" thrust bearing. This, of course, is another major advantage of the subject bearing over a "Kingsbury" type of bearing.

Referring now to FIGURE 4 of the drawing, the subject bearing is shown in a loaded condition which would exist during normal bearing operation when the subject bearing was rotating or moving in the direction of the arrow shown in FIGURE 4 of the drawing. As shown in the drawing, the flexible portion 112 of the segmented thrust bearing member 96 is deflected to form a plurality of wedge-like oil films between the tapered surface 116 of that portion of the thrust bearing member 96 and the mating bearing surface 12 of the stationary bearing member 10 of the subject bearing assembly. Thus, a high unit-area load carrying capacity is provided by the subject bearing during operation. Also, the flexible portions 112 of the thrust bearing member 96 will deflect in proportion to the amount of load which is applied thereto during bearing operation, thereby providing an optimum oil film taper between the opposed bearing surfaces of the subject bearing assembly over a wide range of load conditions. This, of course, is a major advantage of the subject bearing over the "Tapered-Land" type of bearing, since an optimum oil film taper is established in the conventional "Tapered-Land" bearing only when the bearing is operating at its designed speed.

Furthermore, it will be noted that since the segmented flexible thrust bearing member 96 is supported at its outer circumferential periphery on the outer circumferential portion 90 of the relief pad 82, the individual segments 108 will flex more at the radially inner portion of the segments than at the radially outer portion of each segment. Thus, since the taper angle is larger on the inside diameter of the thrust bearing member 96 than on its outside diameter during bearing operation, a better equalization of the oil flow is obtained across the mating bearing surfaces of the subject bearing assembly than in a conventional "Kingsbury" type bearing assembly.

Therefore, a plurality of wedge-like oil films are established between the tapered surfaces of the deflecting portions of the segmented subject bearing member and the mating bearing surface of the other bearing member of the subject bearing assembly in the direction of relative motion between the relatively movable bearing members during normal bearing operation to provide for high unit-area load carrying capacity. Also, the rigidly fixed, generally flat portions of the segmented subject bearing are firmly supported on the underlying base member in such a manner that they are capable of carrying abnormally high loads during the starting period of bearing operation with minimal danger of being permanently elastically deformed. In addition, the contiguous flexible portions of the subject bearing are self-adjusting when thermally or elastically deformed during normal bearing operation to provide an optimum load carrying oil film taper over a wide range of bearing load conditions. Furthermore, the flexible portions of the segmented bearing member may be supported on the underlying base member in such a manner to close the spaces therebetween so that an adequate load carrying oil film may readily be maintained and controlled between the mating bearing surfaces of the subject bearing assembly, thereby eliminating the necessity of using the elaborate lubrication control means which are required in most "Kingsbury" type bearings.

As previously mentioned, although the present invention is illustrated in the thrust bearing assembly shown in the drawing, it is not limited thereto. For instance, a bearing embodying the present invention could readily be adapted by those skilled in the art for use in a conventional conical-type bearing structure in which the subject bearing could serve as both an axial and radial thrust bearing.

Thus, it should be understood that the practical embodiment of the present invention illustrated in the drawing and described in detail is by way of example, and that the invention includes such modifications and equivalents which may readily occur to persons skilled in the art and are within the intended scope of the appended claims.

I claim:

1. A thrust bearing comprising a generally annular bearing member having a plurality of circumferential segmented sections therein arranged to form a bearing surface, a radial portion and the outer circumferential portion of each of said sections being rigidly supported to form a plurality of circumferentially separated, fixed bearing surfaces and another portion of each of said sections contiguous to each of said rigidly supported portions being capable of deflecting under load during bearing operation to provide a plurality of bearing surfaces which taper from said fixed surfaces, the degree of taper in said bearing surfaces being generally proportional to the amount of load applied thereto during bearing operation.

2. A thrust bearing assembly comprising a pair of bearing members having opposed relatively rotatable thrust bearing surfaces thereon, the bearing surface of one of said members being generally annular in shape and being formed by a plurality of circumferentially segmented sections, a radial portion and the outer circumferential portion of each of said sections being rigidly supported to form a plurality of circumferentially separated fixed bearing surfaces, and another portion of each of said sections affixed to each of said rigidly supported portions being capable of deflecting under an axial thrust load during bearing operation to provide a plurality of bearing surfaces which taper from said fixed surfaces and away from said opposed bearing surface of said other bearing member of said thrust bearing assembly.

3. A thrust bearing having a high unit-area load carrying capacity comprising an annular, plate-like, metal thrust washer member; a relatively thin, annular, plate-like, metal relief pad coaxially aligned with and secured to said thrust washer member, said relief pad having a plurality of relieved portions therein which extend axially through said relief pad in a radial direction from its inner diameter toward its outer circumferential peripheral portion which is unrelieved so that said relieved portions in said relief pad are circumferentially separated from each other by a plurality of radially extending, unrelieved portions in said relief pad; and a relatively thin, flexible, plate-like, annular metal thrust bearing member coaxially aligned with and secured to the outer annular end surface of said relief pad, said bearing member having a plurality of circumferentially separated, radially extending slots therein which extend axially through said bearing member from its inner diameter toward its outer circumferential peripheral portion to provide a plurality of flexible, radially extending, segmented sections therein which are equal in number to said relieved portions in said relief pad, said bearing member being indexed on said relief pad so that a portion of each of said segmented sections of said bearing member is rigidly supported on a different contiguous, radially extending, unrelieved portion in said underlying relief pad to provide a plurality of circumferentially separated, radially extending, fixed bearing surfaces on the axially outer end surface of said bearing member, the other portion of each of said segmented sections of said bearing member extending over an adjacent relieved portion in said relief pad so that said latter portions of said bearing member are capable of deflecting into said relieved portions of said relief pad when an axial thrust load is applied thereto during bearing operation, thereby providing a plurality of bearing surfaces which taper from said fixed bearing surfaces during bearing operation to a degree in proportion to the amount of load applied thereto.

4. A thrust bearing having a high unit-area load carrying capacity, said bearing comprising an annular, plate-like, metal thrust washer member; a relatively thin, annular, plate-like, metal relief pad coaxially aligned with and secured to an annular, generally flat end surface of said thrust washer member, said relief pad having a plurality of radially extending, circumferentially separated relieved portions therein which extend axially through said relief pad in a radial direction from its inner diameter almost to its outer circumferential peripheral portion which is unrelieved so that said relieved portions in said relief pad are circumferentially separated from each other by a plurality of radially extending, unrelieved portions in said relief pad, said relieved portions in said relief pad being of greater arcuate cross section than said radially extending unrelieved portions in said relief pad; and a relatively thin, flexible, plate-like, annular, metal thrust bearing member coaxially aligned with and secured to the opposite outer annular end surface of said relief pad, said bearing member having a plurality of circumferentially separated, radially extending, relatively narrow slots therein which extend axially through said bearing member from its inner diameter almost to its outer circumferential peripheral portion to provide a plurality of flexible, radially extending, segmented sections therein which are equal in number to said relieved portions in said relief pad, said annular bearing member having approximately the same inner and outer diameter dimensions as said relief pad and being indexed on said relief pad so that a portion of each of said segmented sections of said bearing member is rigidly supported on a different contiguous, radially extending, unrelieved portion in said underlying relief pad to provide a plurality of circumferentially separated, radially extending, fixed bearing surfaces on the outer end surface of said bearing member, the other portion of each of said segmented sections of said bearing member extending over an adjacent relieved portion in said relief pad so that said latter portions of said bearing member are capable of deflecting into said relieved portions of said relief pad when axial thrust load is applied thereto during bearing operation, thereby providing a plurality of bearing surfaces which taper axially and radially inwardly from said fixed bearing surfaces to a degree in proportion to the amount of load applied thereto during bearing operation.

5. A thrust bearing as defined by claim 4 wherein said thrust washer member, said relief pad and said thrust bearing member are made of steel and are brazed to one another.

6. A thrust bearing assembly having a high unit-area load carrying capacity, said bearing assembly comprising a pair of annular, relatively rotatable, metal bearing elements having opposed, annular, axial thrust bearing surfaces thereon which are adapted to thrust against one another during bearing operation, and means for supplying and distributing lubricating oil to said axial thrust bearing surfaces so that said bearing surfaces are adequately lubricated and separated by a thin film of oil during bearing operation, one of said bearing elements being of the conventional, spherical seat, self-aligning type and being secured in nonrotatable engagement to a machine housing so that said bearing element is stationary during bearing operation, the other of said bearing elements being secured to a shaft and rotatable therewith during bearing operation, said latter bearing element including an annular, plate-like, metal thrust washer member; a relatively thin, plate-like, annular metal relief pad coaxially aligned with and secured thereto to form a base member for said latter bearing element, said relief pad having a plurality of relieved portions therein which extend axially through said relief pad in a radial direction from its inner diameter toward its outer circumferential periphery portion which is unrelieved so that said relieved portions are separated by radially extending, unrelieved portions; and a relatively thin, flexible, plate-like, annular, metal thrust bearing member coaxially aligned with and secured to the outer end surface of said relief pad to provide the axial thrust bearing surface of said bearing element, said bearing member having a plurality of circumferentially separated, radially extending, flexible, segmented sections therein equal in number to said relieved portions in said underlying relief pad, said bearing member being indexed on said relief pad so that a portion of each of said segmented sections of said thrust bearing member is rigidly supported on a different contiguous, radially extending, unrelieved portion in said relief pad to provide a plurality of rigidly fixed, radially extending bearing surfaces in said axial thrust bearing surface of said bearing element, the other portion of each of said segmented sections of said thrust bearing member extending over an adjacent relieved portion in said relief pad so that said latter portions of said bearing member are capable of being deflected into said relieved portions of said relief pad when an axial thrust load is applied thereto during bearing operation, said latter portions deflecting in proportion to the amount of load which is applied thereto during bearing operation to provide an optimum oil film taper between said mating axial thrust bearing surfaces of said bearing elements of said assembly.

References Cited by the Examiner

UNITED STATES PATENTS

| 2,218,034 | 10/1940 | Bartosch | 308—160 |
| 2,424,028 | 7/1947 | Hoeberlein | 308—160 |

FOREIGN PATENTS

| 832,967 | 3/1952 | Germany. |
| 274,581 | 7/1951 | Switzerland. |

DAVID J. WILLIAMOWSKY, *Primary Examiner.*

FRANK SUSKO, *Examiner.*